US005687162A

United States Patent [19]
Yoshida et al.

[11] Patent Number: 5,687,162
[45] Date of Patent: Nov. 11, 1997

[54] DS/CDMA RECEIVER HAVING AN INTERFERENCE CANCELLING FUNCTION CAPABLE OF ASSSURING A DESIRED RECEPTION QUALITY IN A NARROW-BAND DS/CDMA

[75] Inventors: Shousei Yoshida; Akihisa Ushirokawa, both of Tokyo, Japan

[73] Assignee: NEC Corporation, Japan

[21] Appl. No.: 513,428

[22] Filed: Aug. 10, 1995

[30] Foreign Application Priority Data

Aug. 11, 1994 [JP] Japan ................................. 6-189293

[51] Int. Cl.$^6$ .............................. H04B 7/216; H04J 13/02
[52] U.S. Cl. ........................ 370/203; 370/342; 370/441; 375/206; 375/346
[58] Field of Search .............................. 370/18, 19, 20, 370/21, 6, 32.1, 100.1, 105.3, 201, 203, 206, 208, 286, 335, 342, 441, 503, 506, 516; 375/200, 205, 206, 346, 347, 349, 350, 371; 379/406, 410, 411; 455/50.1, 63, 67.3, 68, 296, 307

[56] References Cited

U.S. PATENT DOCUMENTS

| 5,099,493 | 3/1992 | Zeger et al. | 375/206 |
| 5,105,435 | 4/1992 | Stilwell | 370/18 |
| 5,218,619 | 6/1993 | Dent | 375/205 |
| 5,343,496 | 8/1994 | Honig et al. | 375/206 |
| 5,363,403 | 11/1994 | Schilling et al. | 375/205 |

FOREIGN PATENT DOCUMENTS

| 4-185130 | 7/1992 | Japan . |
| 4-347944 | 12/1992 | Japan . |
| 7-30519 | 1/1995 | Japan . |

OTHER PUBLICATIONS

R. Lupas, et al., "Near-Far Resistance of Multiuser Detectors in Asynchronous Channels", *IEEE Transactions on Communications*, vol. 38, No. 4, Apr. 1990, pp. 496–508.

Y.C. Yoon, et al., "A Spread-Spectrum Multi-Access System with a Cascade of Co-Channel Interference Cancellers for Multipath Fading Channels", *IEEE Second International Symposium on Spread-Spectrum Techniques and Applications*, Yokohama, Japan, Nov. 29–Dec. 2, 1992, pp. 87–90.

M. Abdulrahman, et al., "Equalization for Interference Cancellation in Spread Spectrum Multiple Access Systems", *IEEE Proc. VTC '92* pp. 71–74, May 1992.

(List continued on next page.)

*Primary Examiner*—Alpus H. Hsu
*Attorney, Agent, or Firm*—Ostrolenk, Faber, Gerb & Soffen, LLP

[57] ABSTRACT

In a DS/CDMA receiver, each of first and second receiving units (211 and 221) receives a DS/CDMA signal as a received signal. First and second adaptive interference cancellers (212+213, 222+223) are connected to the first and the second receiving units, respectively. Each of the adaptive interference cancellers cancels an interference on the received signal. Connected to the first and the second receiving units and to the first and the second adaptive interference cancellers, a single interference canceller control circuit (204) controls the first and the second adaptive interference cancellers in common. An all output combiner (201) combines all of output signals of the first and the second adaptive interference cancellers. Preferably, each of the adaptive interference cancellers has an adaptive filter (212 or 222) to cancel the interference with respect to all other stations by adaptively making its tap coefficients orthogonal to spreading codes of the all other stations. Each of the adaptive interference cancellers further has a differential detection circuit (213 or 223) to compensate for phase fluctuation of an output signal of the adaptive filter. The single interference canceller control circuit may control the adaptive interference cancellers in common on the basis of best quality control information relating to one of the received signals of the first and the second receiving units that has a best signal quality.

14 Claims, 7 Drawing Sheets

OTHER PUBLICATIONS

U. Madhow, et al., "Minimum Mean Squared Error Interference Suppression For Direct–Sequence Spread–Spectrum Code–Division Multiple–Access", *Proc. 1st Int. Conf, Universal Personal Commun.*, (ICUPC), pp. 273–277, Sep. 1992.

P.B. Rapajic, et al., "Adaptive Receiver Structures for Asynchronous CDMA System", *IEEE Journal of Selected Areas in Communications*, vol. 12, No. 4, May 1994.

S. Yoshida, et al., "DS/CDMA Adaptive Interference Canceller in Mobile Radio Environments", *The Institute of Electronics, Information and Communication Engineers,* Technical Report, (Technical Report of IEICE), RCS93–76, pp. 47–54, Nov. 1993.

DS/CDMA RECEIVER HAVING AN INTERFERENCE CANCELLING FUNCTION CAPABLE OF ASSSURING A DESIRED RECEPTION QUALITY IN A NARROW-BAND DS/CDMA

BACKGROUND OF THE INVENTION

This invention relates to a direct-sequence code-division multiple access receiver (hereinafter referred to as a DS/CDMA receiver) having an interference removing or cancelling function in a direct-sequence code-division multiple access system (DS/CDMA system).

Generally, a DS/CDMA system has a potential of considerably increasing a subscriber capacity and therefore attracts the latest attention as a multiple access (or multiaccess) system in a future mobile communication system. In the DS/CDMA system, a user's station signal is multiplied by a unique spreading code at a high speed to be spread in a wide frequency band. Thereafter, the signal is transmitted to a transmission path. In a receiving side, the signal multiplexed by the spreading code is subjected to a despreading process to detect a desired signal.

In a conventional DS/CDMA receiver, a signal detection is carried out by the use of a matched filter (hereinafter abbreviated to MF) based on a spreading code assigned to a user's station. If despreading is carried out with reference to a particular code used to spread a transmission signal, a user's station signal is correctly reproduced. However, other stations' signals spread by different codes are distributed as if they are noise components. Those noise-like components are considered as an interference from the other stations to the user's station signal. Generally, a power or magnitude of such an interference is small and signal detection of the user's station signal is correctly carried out.

However, when the number of users (the number of the other stations) increases, the power of the interference by the other stations' signals is increased to make correct reception gradually become difficult. In order to cope with such noise problem resulting from the interference by the other stations, proposal is made of several multi-user type interference cancellers capable of efficiently removing interference components by the other stations by the use of information of the spreading codes of all the stations which are involved in communication.

For example, those techniques relating to the multi-user type interference cancellers are disclosed in a reference 1 [R. Lupas and S. Verdu, "Near-far Resistance of Multiuser Detectors in Asynchronous Channels," IEEE Trans. Commun., Vol. 38, no. 4, pp. 496–508, Apr. 1990] and in a reference 2 [P. W. Dent, "CDMA Subtractive Demodulation," U.S. Pat. No. 5,218,619, issued Jun. 8, 1993].

Furthermore, cited is a reference 3 [Y. C. Yoon, R. Kohno, and H. Imai, "A Spread-Spectrum Multi-Access System with a Cascade of Co-Channel Interference Cancelers for Multipath Fading Channels," IEEE 2nd Int. Symp. on Spread Spectrum Techniques and Applications (ISSSTA 1992), pp. 87–90, Yokohama, Japan, Nov. 1992.)].

However, in these multi-user type interference cancellers, it is required to know the spreading codes of all users during multiplexed communication or to carry out reception with respect to all users. In addition, the receiver has a complicated structure. In view of the above, proposal is made of several single-user type interference cancellers having a simple structure in which the interference from other station's components is removed by the use of information of the spreading code of the user's station alone.

For example, those techniques relating to the single-user type interference cancellers are disclosed in a reference 4 [M. Abdulrahman, D. D. Falconer, and A. U. H. Sheikh, "Equalization for Interference Cancellation in Spread Spectrum Multiple Access Systems", Proc. VTC '92, pp. 71–74, May 1992] and in a reference 5 [U. Madhow and M. L. Honig, "Minimum Mean Squared Error Interference Suppression for Direct-Sequence Spread-Spectrum Code-Division Multiple-Access", Proc. 1st Int. Conf. Universal Personal Commun. (ICUPC), pp. 273–277, Sep. 1992].

Furthermore, cited is a reference 6 [P. B. Rapajic and B. Vucetic, "Adaptive Receiver Structures for Asynchronous CDMA Systems", submitted to IEEE J. on Selected Areas in Commun., May 1994]. In addition, cited is a reference 7 [Yoshida, Ushirokawa, Yanagi, and Furuya "DS/CDMA Adaptive Interference Canceller in Mobile Radio Environments", The Institute of Electronics, Information and Communication Engineers, Technical Report (Technical Report of IEICE), RCS93-76, Nov. 1993].

These interference cancellers having an interference removing function for use in DS/CDMA receivers are regarded as important components because a multiple access system of a higher quality and a greater capacity can be achieved as compared with MF receivers.

As techniques relating to receivers typically used in spread communication, cited are a diversity reception device for spectrum spread communication disclosed in Japanese Unexamined Patent Publication No. 4-185130 (namely, 185130/1992), and a spectrum spread demodulation device disclosed in Japanese Unexamined Patent Publication No. 4-347944 (namely, 347944/1992).

If the above-mentioned DS/CDMA receiver is used in the CDMA system of a narrow spread band between 500 kHz and 1 MHz, it is possible to achieve flexible frequency designs adaptable to a hybrid cell structure or a multi-operator structure expected in the future. In addition, in view of operation of the interference canceller, a signal processing speed can be reduced as compared with the use in a wide-band CDMA system. Thus, the receiver is easy to implement.

On the other hand, with such a narrow spread band, fading occurring in a multipath environment becomes frequency-nonselectivity and increases a drop of a signal power. Accordingly, a high C/N value is required in order to obtain a desired reception quality.

SUMMARY OF THE INVENTION

It is therefore an object of this invention to provide a DS/CDMA receiver having an interference cancelling function capable of assuring a desired reception quality with a C/N value suppressed to be low even if used in a narrow-band CDMA system in which a drop of a signal power is enhanced due to fading.

Other objects of this invention will become clear as the description proceeds.

According to a first aspect of this invention, there is provided a DS/CDMA receiver comprising: first through m-th receiving units (111, 121), each of which receives a DS/CDMA signal as a received signal, where m represents a plural number; first through m-th adaptive interference cancellers (110, 120) connected to the first through the m-th receiving units, respectively, each of the first through the m-th adaptive interference cancellers cancelling an interference on the received signal; first through m-th interference canceller control means (115, 125) connected to the first through the m-th receiving units, respectively, and connected to the first through the m-th adaptive interference cancellers, respectively, for controlling the first through the m-th adaptive interference cancellers, respectively; and an all output combiner (101) connected to the first through the m-th adaptive interference cancellers for combining all of output signals of the first through the m-th adaptive interference cancellers.

According to a second aspect of this invention, there is provided a DS/CDMA receiver comprising: first through m-th receiving units (211, 221), each of which receives a DS/CDMA signal as a received signal, where m represents a plural number; first through m-th adaptive interference cancellers (212+213, 222+223) connected to the first through the m-th receiving units, respectively, each of the first through the m-th adaptive interference cancellers cancelling an interference on the received signal; single interference canceller control means (204) connected to the first through the m-th receiving units and connected to the first through the m-th adaptive interference cancellers for controlling the first through the m-th adaptive interference cancellers in common; and an all output combiner (201) connected to the first through the m-th adaptive interference cancellers for combining all of output signals of the first through the m-th adaptive interference cancellers.

According to a third aspect of this invention, there is provided a DS/CDMA receiver comprising: first through m-th receiving units (311, 321), each of which receives a DS/CDMA signal as a received signal having a primary wave component and a secondary wave component following the primary wave component, where m represents a first plural number; first through m-th primary adaptive interference cancellers ($313_n+314_n$, $323_n+324_n$) connected to the first through the m-th receiving units, respectively, each of the first through the m-th primary adaptive interference cancellers cancelling an interference for the primary wave component of the received signal (to produce only the primary wave component); first through m-th secondary adaptive interference cancellers ($313_1+314_1$, $323_1+324_1$) connected to the first through the m-th receiving units, respectively, each of the first through the m-th secondary adaptive interference cancellers cancelling an interference for the secondary wave component of the received signal (to produce only the secondary wave component); first through m-th primary interference canceller control means ($304_{1n}$, $304_{2n}$) connected to the first through the m-th receiving units, respectively, and connected to the first through the m-th primary adaptive interference cancellers, respectively, for controlling the first through the m-th primary adaptive interference cancellers, respectively; first through m-th secondary interference canceller control means ($304_{11}$, $304_{21}$) connected to the first through the m-th receiving units, respectively, and connected to the first through the m-th secondary adaptive interference cancellers, respectively, for controlling the first through the m-th secondary adaptive interference cancellers, respectively; and an all output combiner (301, 315, 325) connected to the first through the m-th primary adaptive interference cancellers and connected to the first through the m-th secondary adaptive interference cancellers for combining all of output signals of the first through the m-th primary adaptive interference cancellers and of the first through the m-th secondary adaptive interference cancellers.

According to a fourth aspect of this invention, there is provided a DS/CDMA receiver comprising: first through m-th receiving units (411, 421), each of which receives a DS/CDMA signal as a received signal having a primary wave component and a secondary wave component following the primary wave component, where m represents a first plural number; first through m-th primary adaptive interference cancellers ($413_n+414_n$, $423_n+424_n$) connected to the first through the m-th receiving units, respectively, each of the first through the m-th primary adaptive interference cancellers cancelling an interference for the primary wave component of the received signal (to produce only the primary wave component); first through m-th secondary adaptive interference cancellers ($413_1+414_1$, $423_1+424_1$) connected to the first through the m-th receiving units, respectively, each of the first through the m-th secondary adaptive interference cancellers cancelling an interference for the secondary wave component of the received signal (to produce only the secondary wave component); single primary interference canceller control means ($404_n$) connected to the first through the m-th receiving units and connected to the first through the m-th primary adaptive interference cancellers for controlling the first through the m-th primary adaptive interference cancellers in common; single secondary interference canceller control means ($404_1$) connected to the first through the m-th receiving units and connected to the first through the m-th secondary adaptive interference cancellers for controlling the first through the m-th secondary adaptive interference cancellers in common; and an all output combiner (401, 415, 425) connected to the first through the m-th primary adaptive interference cancellers and connected to the first through the m-th secondary adaptive interference cancellers for combining all of output signals of the first through the m-th primary adaptive interference cancellers and of the first through the m-th secondary adaptive interference cancellers.

DESCRIPTION OF THE PREFERRED EMBODIMENTS

Figure 1:
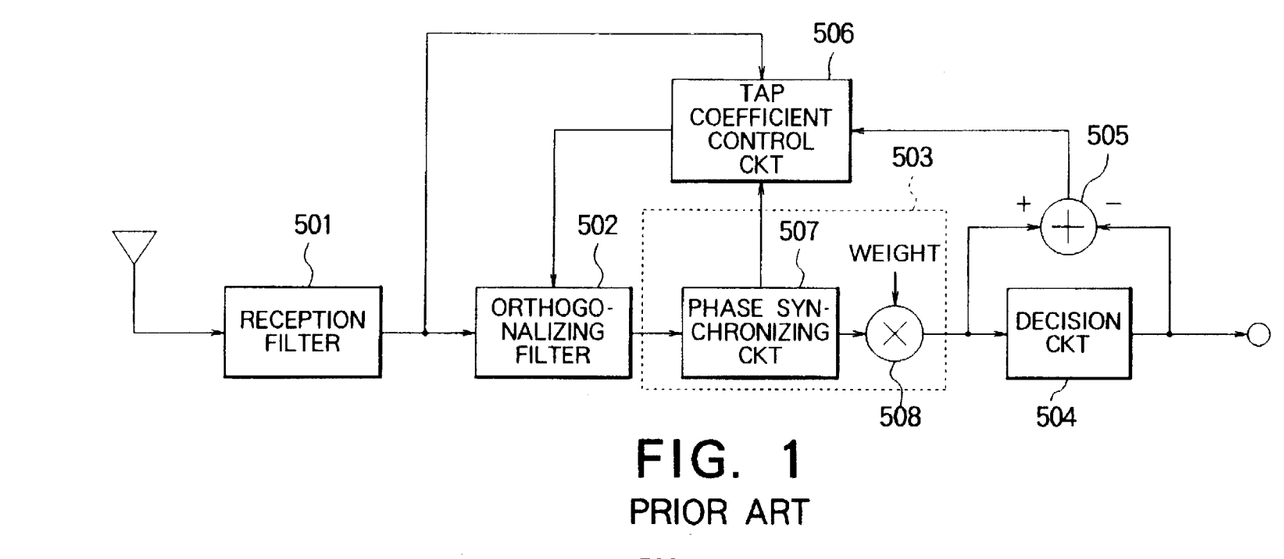
FIG. 1 is a block diagram of a conventional DS/CDMA receiver.

Referring to FIG. 1, a conventional DS/CDMA receiver will first be described for a better understanding of this invention. In the DS/CDMA receiver, a DS/CDMA signal is received by an antenna branch (more specifically called an antenna diversity branch) and is filtered by a reception filter 501 at a predetermined frequency band to be produced as a filtered signal. Then, the filtered signal is orthogonalized by an orthogonalizing filter 502 controlled by a tap coefficient control circuit 506 supplied with the filtered signal and is transmitted to a phase synchronizing circuit 507 as an orthogonalized filtered signal. The phase synchronizing circuit 507 synchronizes a phase of the orthogonalized filtered signal to produce a synchronized signal which is transmitted to the tap coefficient control circuit 506 and a multiplier 508. The multiplier 508 multiplies the synchronized signal by a predetermined weight to produce a weight-multiplied synchronized signal which is delivered to a decision circuit 504. The decision circuit 504 produces a decision signal representative of a decision result whether the weight-multiplied synchronized signal has a positive sign or a negative sign. Those input and output signals to and from the decision circuit 504 are supplied to a subtractor 505 to produce a subtraction signal representative of a subtraction result obtained by subtracting the output signal from the input signal. The subtraction signal is delivered to the tap coefficient control circuit 506. Typically, an array 503 of the phase synchronizing circuit 507 and the multiplier 508 is provided in a number sufficient to process a plurality of codes as used.

Figure 2:
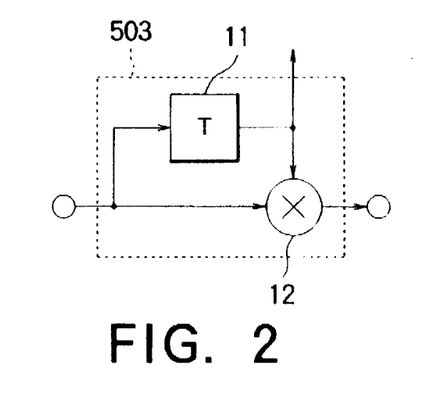
FIG. 2 is a block diagram of a delay detection circuit used in the DS/CDMA receiver of FIG. 1 and in this invention.

Referring to FIG. 2, a combination 503 of the phase synchronizing circuit 507 and the multiplier 508 in FIG. 1 is realized by using a differential detection circuit 503 having a combination of a delay element 11 having a delay equal to one bit of the received signal and a multiplier 12. The illustrated differential detection circuit 503 simultaneously carries out a phase synchronizing operation of the phase synchronizing circuit 507 (FIG. 1) and a weighting operation of the multiplier 508 (FIG. 1).

Figure 3:
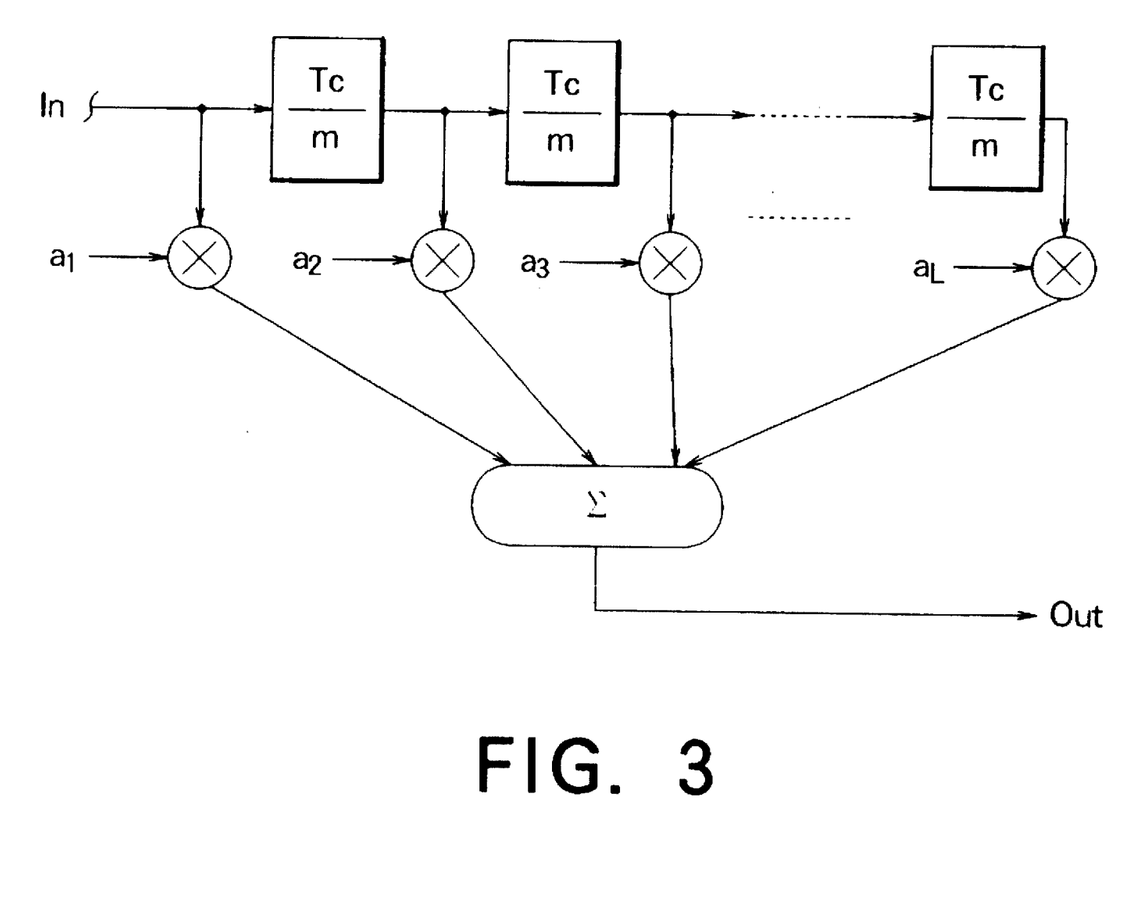
FIG. 3 is a block diagram of an orthogonalizing filter of the DS/CDMA receiver of FIG. 1 and in this invention.

Referring to FIG. 3, the orthogonalizing filter 502 (FIG. 1) multiplies, in response to a control signal from the tap coefficient control circuit 506, the filtered signal supplied as an input signal (In) by tap coefficients $a_1, a_2, a_3, \ldots, a_L$ at every interval between a predetermined number of fraction chip delay elements $T_c/m$ arranged in sequence. Thereafter, total sum ($\Sigma$) of those products is obtained as an output signal (Out) which is the orthogonalized signal. In other words, the orthogonalizing filter 502 serves as an adaptive filter for producing tap coefficients orthogonal to spreading codes of all other stations to remove an interference.

Figure 4A:
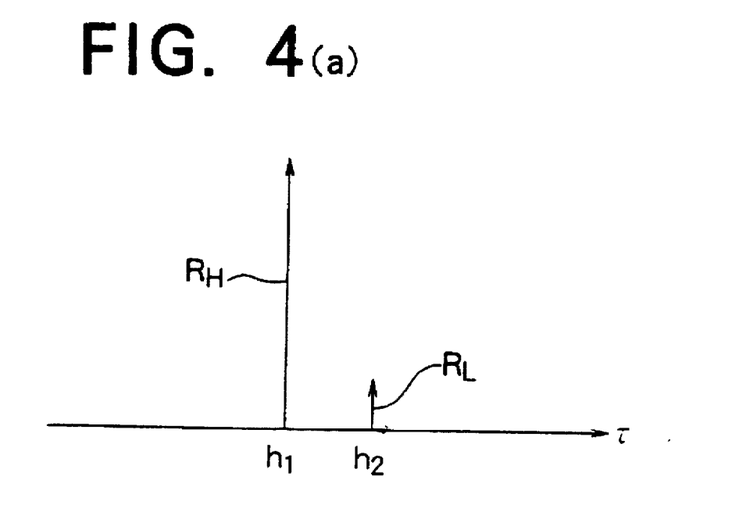
FIG. 4 is a view for use in describing a transmission path response condition in the DS/CDMA receiver of FIG. 1 and in this invention.
Figure 4B:
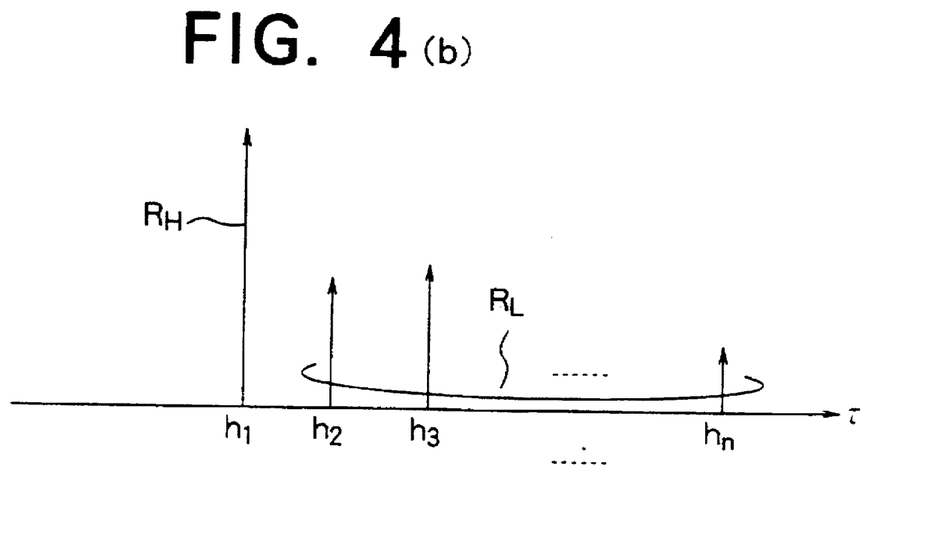

In the DS/CDMA receiver, it is assumed that delay distribution is small as illustrated in FIG. 4(a) and that a response $R_H$ to a desired wave appears at a time instant $h_1$ in a delay time $\tau$. In this event, a response $R_L$ to a delayed wave appears only at a time instant $h_2$ in the delay time $\tau$. On the other hand, when the delay distribution is large as illustrated in FIG. 4(b), a plurality of such responses appear at time instants $h_2, h_3, \ldots$, and $h_n$ in the delay time $\tau$. It is noted here that the desired wave is a major transmission path response component of a high power having an earliest arrival time instant.

Figure 5:
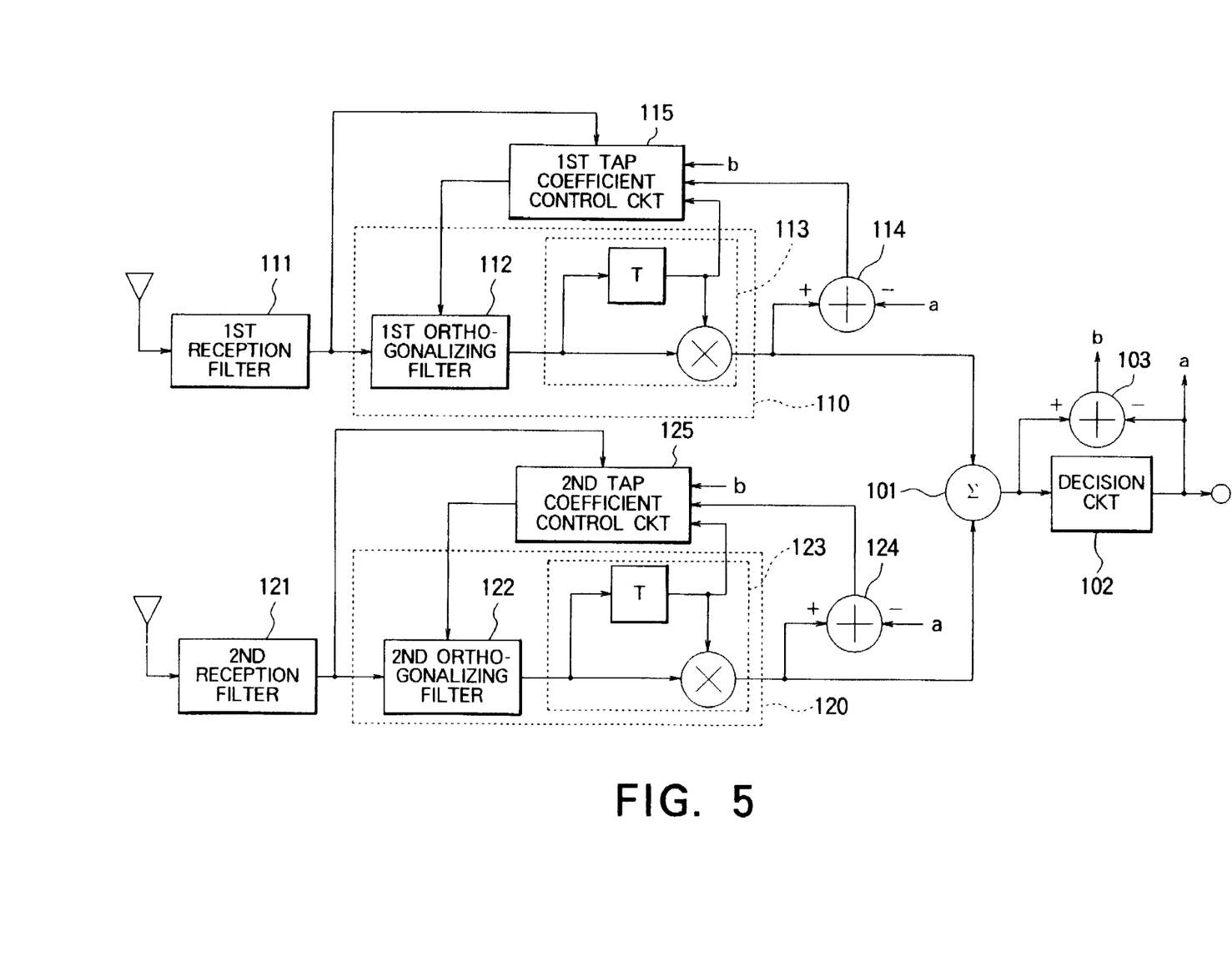
FIG. 5 is a block diagram of a DS/CDMA receiver according to a first embodiment of this invention.

Referring to FIG. 5, a DS/CDMA receiver according to a first embodiment of this invention is effective when it is used in a narrow-band CDMA system in which a signal power drop resulting from fading is large and when a reception signal contains, as a main transmission path response component of a high power, only one desired wave component having an earliest arrival time instant as illustrated in FIG. 4(a).

In FIG. 5, the DS/CDMA receiver comprises first and second adaptive interference cancellers 110 and 120 for removing or cancelling an interference from DS/CDMA signals received in two antenna branches, respectively, an all output combiner 101 for combining all of output signals from the adaptive interference cancellers 110 and 120, and a first tap coefficient control circuit 115 and a second tap coefficient control circuit 125 which serve as two interference canceller control circuits for controlling the adaptive interference cancellers 110 and 120 independently with respect to the antenna branches.

Herein, the adaptive interference canceller 110 comprises a first orthogonalizing filter 112 as an adaptive filter for producing tap coefficients orthogonal to spreading codes of all other stations to remove the interference, and a first differential or delay detection circuit 113 for compensating phase fluctuation with reference to a signal from which the interference has been removed with respect to all other stations. Likewise, the adaptive interference canceller 120 comprises a second orthogonalizing filter 122 and a second differential detection circuit 123 which are operable in the manner similar to the first differential detection circuit 113 and to the differential detection circuits 503 illustrated in FIG. 2.

In the DS/CDMA receiver, a DS/CDMA signal received through one antenna branch is filtered by a first reception filter 111 at a predetermined frequency band to be produced as a filtered signal which is referred to as a received signal. The first reception filter 111 is referred to as a first receiving unit which receives the DS/CDMA signal as the received signal. Then, the filtered signal is orthogonalized by the first orthogonalizing filter 112 controlled by the first tap coefficient control circuit 115 supplied with the filtered signal and is transmitted to the first differential detection circuit 113 as an orthogonalized filtered signal. In the first differential detection circuit 113, a phase synchronizing circuit (or a delay element) T synchronizes a phase of the orthogonalized filtered signal to produce a synchronized signal which is delivered to the first tap coefficient control circuit 115 and a multiplier. The multiplier multiplies the synchronized signal by a predetermined weight to produce a weight-multiplied synchronized signal which is delivered to a subtractor 114 and the all output combiner 101. On the other hand, another DS/CDMA signal received through the other antenna branch is filtered by a second reception filter 121 at a predetermined frequency band to be produced as a filtered signal which is also referred to as a received signal. The second reception filter 121 is referred to as a second receiving unit which receives the DS/CDMA signal as the received signal. Then, the filtered signal is orthogonalized by the second orthogonalizing filter 122 controlled by the second tap coefficient control circuit 125 supplied with the filtered signal and is transmitted to the second differential detecting circuit 123 as an orthogonalized filtered signal. In the second differential detection circuit 123, a phase synchronizing circuit (or a delay element) T synchronizes a phase of the orthogonalized filtered signal to produce a synchronized signal which is delivered to the second tap coefficient control circuit 125 and a multiplier. The multiplier multiplies the synchronized signal by a predetermined weight to produce a weight-multiplied synchronized signal which is delivered to a subtractor 124 and the all output combiner 101.

Specifically, the tap coefficients of the first orthogonalizing filter 112 are calculated by the first tap coefficient control circuit 115. The tap coefficients of the second orthogonalizing filter 122 are calculated by the second tap coefficient control circuit 125. Each of the orthogonalizing filters 112 and 122 is implemented by a linear adaptive filter as illustrated in FIG. 3.

Supplied from the all output combiner 101 with a synchronized combined signal representative of a total sum of the weight-multiplied synchronized signals, a decision circuit 102 produces a decision signal a representative of a result of decision of whether the synchronized combined signal has a positive sign or a negative sign. Those input and output signals to and from the decision circuit 102 are supplied to a subtractor 103. A subtraction signal b representative of a subtraction result (input−output) is delivered to the first tap coefficient control circuit 115 and the second tap coefficient control circuit 125. The decision signal a which is the output signal of the decision circuit 102 is delivered to the subtractors 114 and 124. Supplied with the multiplied signal from the multiplier in the first differential detection circuit 113 and with the decision signal a from the decision circuit 102, the subtractor 114 produces a subtraction signal (multiplied signal–decision signal a) to be delivered to the first tap coefficient control circuit 115. Supplied with the multiplied signal from the multiplier in the second differential detection circuit 123 and with the decision signal a from the decision circuit 102, the subtractor 124 produces a subtraction signal (multiplied signal–decision signal a) to be delivered to the second tap coefficient control circuit 125.

In the DS/CDMA receiver, the adaptive interference cancellers 110 and 120 comprise a combination of the orthogonalizing filter 112 and the differential detection circuit 113 and a combination of the orthogonalizing filter 122 and the differential detection circuit 123, respectively. However, the adaptive interference canceller may comprise an adaptive filter for producing tap coefficients orthogonal to spreading codes of all other stations to remove an interference. Alternatively, the adaptive interference canceller may comprise an adaptive filter for producing tap coefficients orthogonal to spreading codes of all other stations to remove an interference, and synchronization detecting circuit for compensating phase fluctuation resulting from fading with reference to a signal from which an interference from other stations has been removed. In addition, use may be made of a structure disclosed in Japanese Patent Application No. 5-169092 (namely, 169092/1993) and those structures disclosed in the above-mentioned references 1 through 7. The principle of orthogonalization is described in detail in the above-mentioned Japanese Patent Application No. 5-169092 and in the reference 7.

In this DS/CDMA receiver, it is expected that the signal power drop resulting from fading is independent between the antenna branches. This reduces a probability of simultaneous power drop of the DS/CDMA signals in these antenna branches. In the DS/CDMA receiver, each antenna branch independently receives the DS/CDMA signal subjected to an influence of fading. After the interference from other stations is removed at each antenna branch, diversity combination is carried out. Thus, an excellent reception quality is maintained at a low C/N value.

As the subtraction signal b delivered to the tap coefficient control circuit 115 and 125, use may be made of an error signal in the DS/CDMA signal received through each antenna branch or an error signal by a combined signal which is a combination thereof. As a specific control scheme in such an event, use can be made of a method described in the reference 7 for example.

Figure 6:
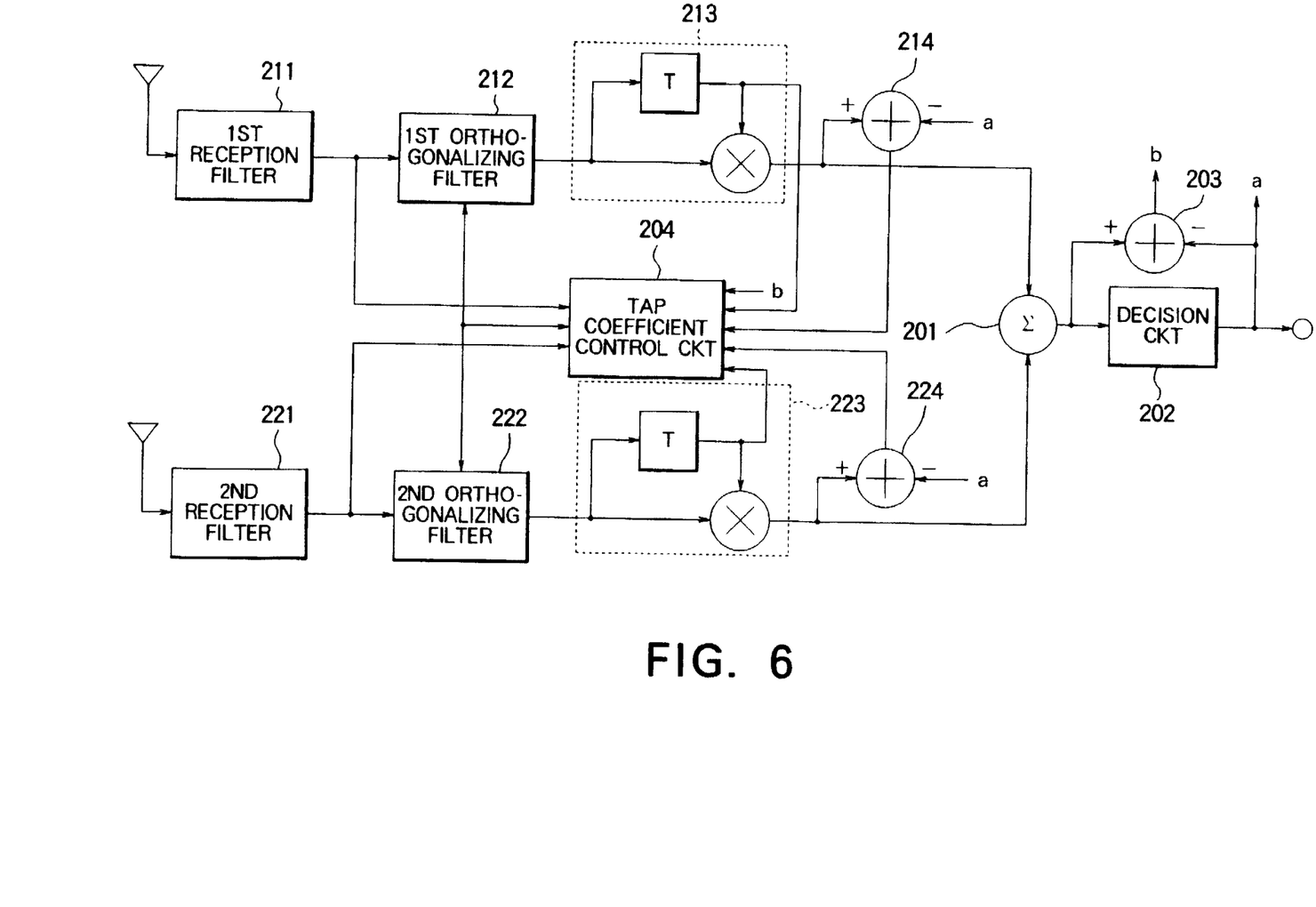
FIG. 6 is a block diagram of a DS/CDMA receiver according to a second embodiment of this invention.

Referring to FIG. 6, a DS/CDMA receiver according to a second embodiment of this invention is also effective when it is used in a narrow-band CDMA system in which a signal power drop resulting from fading is large. In FIG. 6, the DS/CDMA receiver comprises two adaptive interference cancellers for removing an interference in correspondence to two antenna branches, respectively, an all output combiner 201 for combining all of output signals from the adaptive interference cancellers, and tap coefficient control circuit 204 which serves as a single interference canceller control circuit for controlling the adaptive interference cancellers in common with respect to the antenna branches.

The tap coefficient control circuit 204 carries out common control by the use of best quality control information relating to one of the antenna branches that has a most excellent signal quality. One of the adaptive interference cancellers comprises a first orthogonalizing filter 212 as an adaptive filter for producing tap coefficients orthogonal to spreading codes of all other stations to remove the interference, and a first differential detection circuit 213 for compensating phase fluctuation with reference to a signal from which the interference has been removed with respect to all other stations. The other adaptive interference canceller comprises a second orthogonalizing filter 222 and a second differential detection circuit 223 which are operable in a similar manner as mentioned above. Thus, each adaptive interference canceller is separated into the orthogonalizing filter and the differential detection circuit. With this structure, an interference removing function and a carrier wave phase compensating function are separated.

With the adaptive interference canceller of the above-mentioned structure, it is possible to stably obtain the tap coefficients of the orthogonalizing filters irrespective of the phase and the amplitude of a user's station signal once the spreading codes of all stations in the DS/CDMA system and the timings thereof are determined, as described in the reference 7. Accordingly, in this DS/CDMA receiver, the same value can be used as the tap coefficients of the orthogonalizing filters 212 and 222. It is noted here that, if the same value is used as the tap coefficients in the DS/CDMA receiver of FIG. 5, control of the tap coefficients inevitably becomes unstable when a C/I ratio (carrier wave power/interference wave power) is decreased due to fading with respect to each antenna branch. This is because the tap coefficient control circuit 115 and 125 carry out tap control independently with respect to the respective antenna branches.

In this DS/CDMA receiver, a DS/CDMA signal received through one antenna branch is filtered by a first reception filter 211 at a predetermined frequency band to be produced as a filtered signal which is referred to as a received signal. The first reception filter 211 is referred to as a first receiving unit which receives the DS/CDMA signal as the received signal. Then, the filtered signal is orthogonalized by the first orthogonalizing filter 112 controlled by the tap coefficient control circuit 204 supplied with the filtered signal and is transmitted to the first differential detection circuit 213 as an orthogonalized filtered signal. In the first differential detection circuit 213, a phase synchronizing circuit T synchronizes a phase of the orthogonalized filtered signal to produce a synchronized signal which is delivered to the tap coefficient control circuit 204 and a multiplier. The multiplier multiplies the synchronized signal by a predetermined weight to produce a weight-multiplied synchronized signal which is delivered to a subtractor 214 and the all output combiner 101.

On the other hand, another DS/CDMA signal received through the other antenna branch is filtered by a second reception filter 221 at a predetermined frequency band to be produced as a filtered signal which is referred to as a received signal. The second reception filter 221 is referred to as a second receiving unit which receives the DS/CDMA signal as the received signal. Then, the filtered signal is orthogonalized by the second orthogonalizing filter 222 controlled by the tap coefficient control circuit 204 supplied with the filtered signal and is transmitted to the second differential detection circuit 223 as an orthogonalized filtered signal. In the second differential detection circuit 223, a phase synchronizing circuit T synchronizes a phase of the orthogonalized filtered signal to produce a synchronized signal which is delivered to the tap coefficient control circuit 225 and a multiplier. The multiplier multiplies the synchronized signal by a predetermined weight to produce a weight-multiplied synchronized signal which is delivered to a subtractor 224 and the all output combiner 201.

Supplied from the all output combiner 201 with a synchronized combined signal representative of a total sum of the weight-multiplied synchronized signals, a decision circuit 202 produces a decision signal a representative of a result of decision of whether the synchronized combined signal has a positive sign or a negative sign. Those input and output signals to and from the decision circuit 202 are supplied to a subtractor 203. A subtraction signal b representative of a subtraction result (input−output) is delivered to the tap coefficient control circuit 204. The decision signal a which is the output signal of the decision circuit 202 is delivered to the subtractors 214 and 224. Supplied with the multiplied signal from the multiplier in the first differential detection circuit 213 and with the decision signal a from the decision circuit 202, the subtractor 214 produces a subtraction signal (multiplied signal−decision signal a) to be delivered to the tap coefficient control circuit 204. Supplied with the multiplied signal from the multiplier in the second differential detection circuit 223 and with the decision signal a from the decision circuit 202, the subtractor 224 produces a subtraction signal (multiplied signal−decision signal a) to be delivered to the tap coefficient control circuit 204.

In the above-described DS/CDMA receiver, the tap coefficient control circuit 204 calculates the tap coefficient which is used in common to the antenna branches by the use of the best quality control information. It is therefore possible to avoid instability in controlling the tap coefficients. Like in the DS/CDMA receiver of FIG. 5, an excellent reception quality is maintained at a low C/N level.

Summarizing, the tap coefficient control circuit 204 serves as the single interference canceller control circuit. The single interference canceller control circuit controls first and second adaptive interference cancellers (212+213 and 222+223) in common on the basis of best quality control information relating to one of the received signals of the first and the second receiving units (211 and 221) that has a best signal quality among the received signals of the first and the second receiving units.

Figure 7:
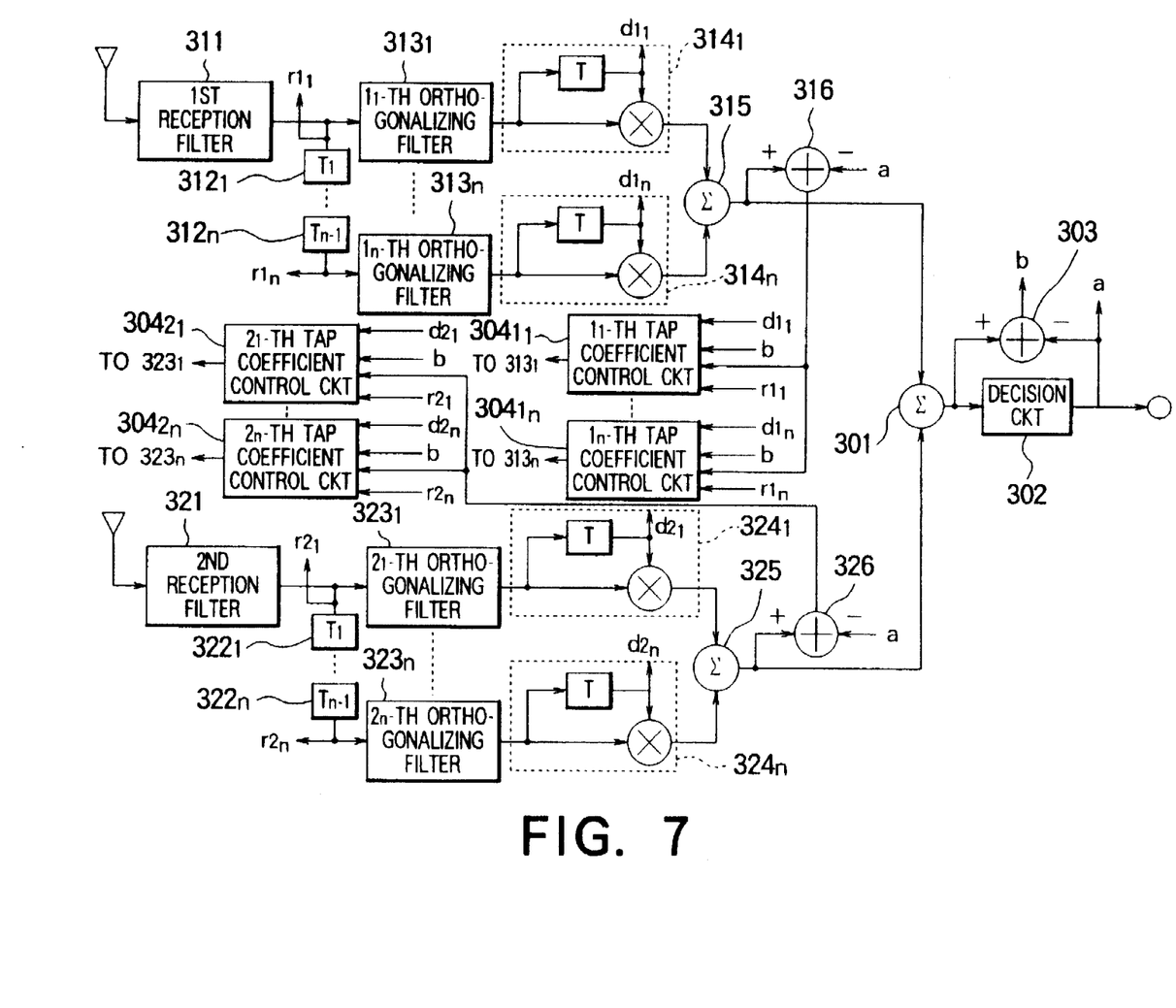
FIG. 7 is a block diagram of a DS/CDMA receiver according to third embodiment of this invention.

Referring to FIG. 7, a DS/CDMA receiver according to a third embodiment of this invention is effective when it is used in a narrow-band CDMA system in which a signal power drop resulting from fading is large and when a plurality of transmission path response components are present in a DS/CDMA signal received through each antenna branch in a frequency selective fading environment in which delay waves having late arrival time instants are present in addition to a desired wave having an earliest arrival time instant, as illustrated in FIG. 4(b).

In FIG. 7, the DS/CDMA receiver comprises a plurality of adaptive interference cancellers for removing an interference individually from a desired wave having an earliest arrival time instant and a plurality of delayed waves having late arrival time instants with respect to two antenna branches, respectively, an all output combiner 301 for combining all of output signals from the adaptive interference cancellers, and $1_1$-th through $1_n$-th tap coefficient control circuits $304_{11}$ through $304_{1n}$ and $2_1$-th through $2_n$-th tap coefficient control circuits $304_{21}$ through $304_{2n}$ as a plurality of interference canceller control circuit for controlling a plurality of the adaptive interference cancellers in one-to-one correspondence to the desired wave and the delayed waves independently with respect to the respective antenna branches.

The plurality of adaptive interference cancellers comprise $1_1$-th through $1_n$-th orthogonalizing filters $313_1$ through $313_n$ and $2_1$-th through $2_n$-th orthogonalizing filters $323_1$ through $323_n$ as a plurality of adaptive filters for producing tap coefficients orthogonal to spreading codes of all other stations to remove the interference, and $1_1$-th through $1_n$-th differential detection circuit $314_1$ through $314_n$ and $2_1$-th through $2_n$-th differential detection circuit $324_1$ through $324_n$ for compensating phase fluctuation with reference to a signal from which the interference has been removed with respect to all other stations. Thus, the adaptive interference cancellers are provided in one-to-one correspondence to the desired wave and the delayed waves with respect to each antenna branch.

In the DS/CDMA receiver, a DS/CDMA signal received through one antenna branch is filtered by a first reception filter 311 (which is referred to as a first receiving unit) at a predetermined frequency band to be produced as a filtered signal which is referred to as a received signal. Thereafter, the filtered signal is orthogonalized by the orthogonalizing filters $313_1$ to $313_n$ controlled by the tap coefficient control circuits $304_{1n}$ to $304_{1n}$ supplied with a plurality of delayed signals $r_{11}$ to $r_{1n}$ obtained by delaying the filtered signal at a plurality of phase synchronizing circuits ($T_1$ to $T_{n-1}$) $312_1$ to $312_n$ with a delay of ($T_i$+ . . . +$T_{i-1}$) for an (i−1)-th (i=2 to n) delayed wave. The signals $r_{1n}$ and $r_{11}$ are referred to as primary and secondary wave components of the received signal, respectively. The secondary wave component follows the primary wave component in the received signal. Orthogonalized filtered signals are transmitted to the differential detection circuits $314_1$ to $314_n$. In the differential detection circuits $314_1$ to $314_n$, phase synchronizing circuits T synchronize phases of the orthogonalized filtered signals to produce synchronized signals $d_{11}$ to $d_{1n}$ which are delivered to the tap coefficient control circuit $304_{11}$ to $304_{1n}$ and multipliers in the differential detection circuits. The multipliers multiply the synchronized signals $d_{11}$ to $d_{1n}$ by predetermined weights to produce weight-multiplied signals which are delivered to a combiner 315. The combiner 315 combines the signals into a combined signal which is delivered to a subtractor 316 and the all output combiner 301.

A DS/CDMA signal received through the other antenna branch is filtered by a second reception filter 321 (which is referred to as a second receiving unit) at a predetermined frequency band to be produced as a filtered signal which is also referred to as a received signal. Thereafter, the filtered signal is orthogonalized by the orthogonalizing filters $323_1$ to $323_n$ controlled by the tap coefficient control circuits $304_{21}$ to $304_{2n}$ supplied with a plurality of delayed signals $r_{21}$ to $r_{2n}$ obtained by delaying the filtered signal at a plurality of phase synchronizing circuits ($T_1$ to $T_{n-1}$) $322_1$ to $322_n$ with a delay of ($T_i$+ . . . +$T_{i-1}$) for an (i−1)-th (i=2 to n) delayed wave. The signals $r_{2n}$ and $r_{21}$ are also referred to as the primary and the secondary wave components of the received signal, respectively. Orthogonalized filtered signals are transmitted to the differential detection circuits $324_1$ to $324_n$. In the differential detection circuits $324_1$ to $324_n$, phase synchronizing circuits T synchronize phases of the orthogonalized filtered signals to produce synchronized signals $d_{21}$ to $d_{2n}$ which are delivered to the tap coefficient control circuits $304_{21}$ to $304_{2n}$ and multipliers in the differential detection circuit. The multipliers multiply the synchronized signals $d_{21}$ to $d_{2n}$ by predetermined weights to produce weight-multiplied signals which are delivered to a combiner 325. The combiner 325 combines the signals into a combined signal which is delivered to a subtractor 326 and the all output combiner 301. Thus, the tap coefficients of the orthogonalizing filters $313_1$ to $313_n$ are calculated by the tap coefficient control circuits $304_{11}$ to $304_{1n}$ while the tap coefficients of the orthogonalizing filters $323_1$ to $323_n$ are calculated by the tap coefficient control circuits $304_{21}$ to $304_{2n}$.

Supplied from the all output combiner 301 with a synchronized combined signal representative of a total sum of the weight-multiplied synchronized signals, a decision circuit 302 produces a decision signal a representative of a result of decision of whether the synchronized combined signal has a positive sign or a negative sign. Those input and output signals to and from the decision circuit 302 are supplied to a subtractor 303. A subtraction signal b representative of a subtraction result (input–output) is delivered to the tap coefficient control circuits $304_{11}$ to $304_{1n}$ and $304_{21}$ to $304_{2n}$. The decision signal a which is the output signal of the decision circuit 302 is delivered to the subtractors 316 and 326. Supplied with the combined signal from the combiner 315 and with the decision signal a, the subtractor 316 produces a subtraction signal (combined signal–decision signal a) to be delivered to the tap coefficient control circuits $304_{11}$ to $304_{1n}$. Supplied with the combined signal from the combiner 325 and with the decision signal a, the subtractor 326 produces a subtraction signal (combined signal–decision signal a) to be delivered to the tap coefficient control circuits $304_{21}$ to $304_{2n}$.

In the DS/CDMA receiver, the desired wave and the delayed waves are subjected to interference removal by the orthogonalizing filters $313_i$ and $314_i$ (i=1 through n, i=1 representing the desired wave, i=2 through n representing the delayed waves) and to phase synchronization by the differential detection circuits $314_i$ and $324_i$ (i=1 through n). The combiners 315 and 325 combine those outputs for the desired wave and the delayed waves. In the orthogonalizing filters $313_i$ and $314_i$ (i=1 through n) in the respective branches, adaptive control of the tap coefficients are independently carried out so that those components having different arrival time instants are dealt with as interferences to remove influences therefrom, not only with respect to the other station's signals but also with respect to the user's station signal.

Like the foregoing embodiments, this DS/CDMA receiver can achieve an excellent reception quality at a low C/N value. Particularly, the receiver according to this embodiment presents both a spatial diversity effect obtained by combining the DS/CDMA signals received through the respective antenna branches and a path diversity effect obtained by combining multipath wave components.

Figure 8:
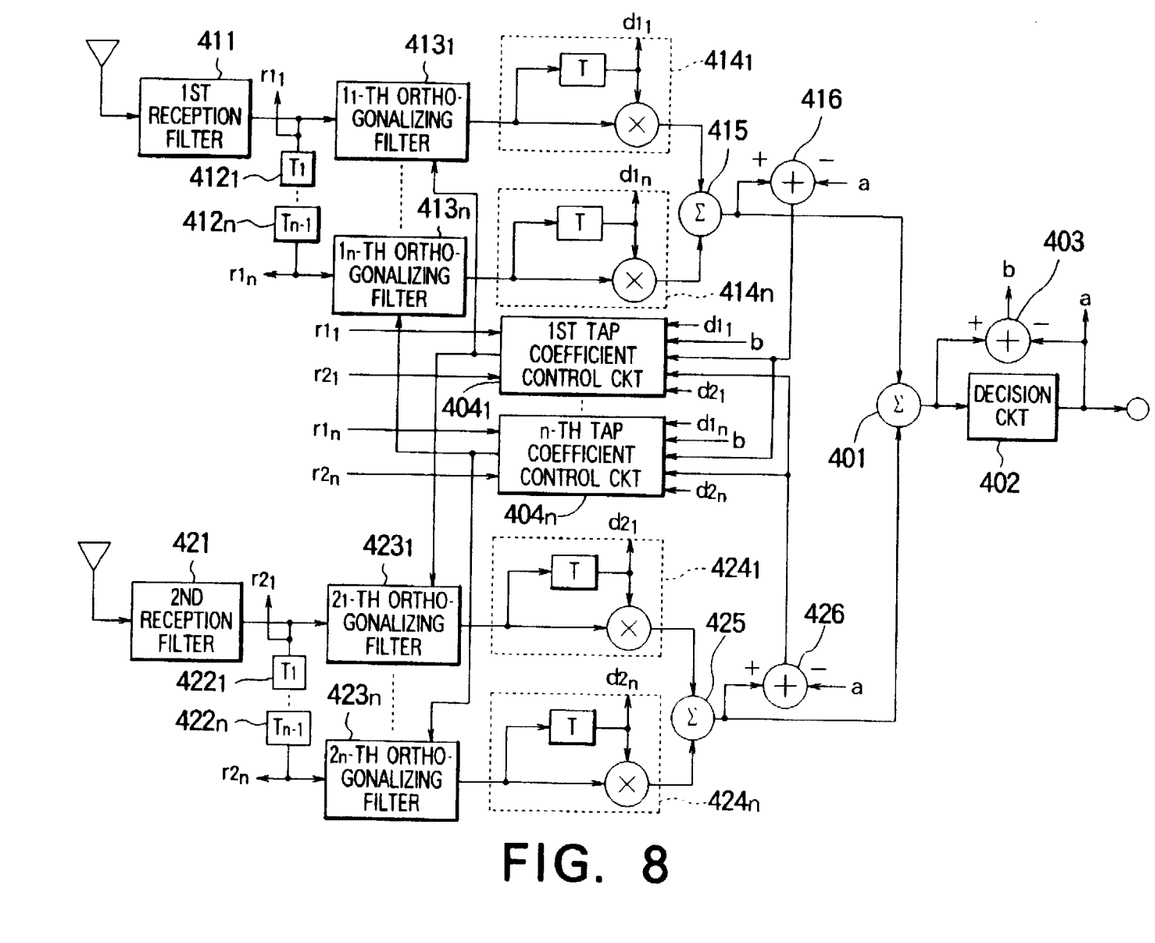
FIG. 8 is a block diagram of a DS/CDMA receiver according to a fourth embodiment of this invention.

Referring to FIG. 8, a DS/CDMA receiver according to a fourth embodiment of this invention is effective when it is used in a narrow-band CDMA system in which a signal power drop resulting from fading is large and when a plurality of transmission path response components are present in a DS/CDMA signal received through each antenna branch in a frequency selective fading environment in which delayed waves are present in addition to the desired wave, like the DS/CDMA receiver of FIG. 7.

In FIG. 8, the DS/CDMA receiver comprises a plurality of adaptive interference cancellers for removing an interference individually from a desired wave and a plurality of delayed waves with respect to two antenna branches, respectively, an all output combiner 401 for combining all of output signals from the adaptive interference cancellers, and first through n-th tap coefficient control circuits $404_1$ through $404_n$ as a plurality of interference canceller control circuits for controlling the adaptive interference cancellers in one-to-one correspondence to the desired wave and the delayed waves in common with respect to the respective antenna branches.

Herein, each of the tap coefficient control circuits $404_1$ to $404_n$ carries out common control by the use of desired wave best quality control information relating to one of the antenna branches that has a best signal quality with respect to the desired wave and delayed wave best quality control information relating to one of the antenna branches that has a best signal quality with respect to the delayed waves. The adaptive interference cancellers comprise $1_1$-th through $1_n$-th orthogonalizing filters $413_1$ to $413_n$ and $2_1$-th through $2_n$-th orthogonalizing filters $423_1$ to $423_n$ as adaptive filters for producing tap coefficients orthogonal to spreading codes of all other stations to remove the interference, and $1_1$-th through $1_n$-th differential detection circuits $414_1$ to $414_n$ and $2_1$-th through $2_n$-th differential detection circuits $424_1$ to $424_n$ for compensating phase fluctuation with reference to a signal from which the interference has been removed with respect to all other stations. Thus, each adaptive interference canceller is separated into the orthogonalizing filter and the differential detection circuit. With this structure, an interference removing function and a carrier wave phase compensation function are separated.

With the adaptive interference canceller of the above-mentioned structure, it is possible to stably obtain the tap coefficients of the orthogonalizing filters individually for the desired wave and the delayed waves irrespective of the phase and the amplitude of delayed wave components relating to the user's station signal, once the spreading codes of all stations in the DS/CDMA system and the timings thereof are determined. Accordingly, in this DS/CDMA receiver, the same tap coefficient value can be used in the orthogonalizing filters for the same desired wave or the same delayed wave. For example, the same tap coefficient value can be used for the orthogonalizing filter $413_1$ corresponding to the desired wave and for the orthogonalizing filter $423_1$ in the second branch corresponding to the same desired wave. Likewise, another same tap coefficient value can be used for the orthogonalizing filter $413_n$ corresponding to the n-th delayed wave and for the orthogonalizing filter $423_n$ corresponding to the same n-th delayed wave. It is noted here that, if the same value is used as the tap coefficients in the DS/CDMA receiver according to the third embodiment of this invention, control of the tap coefficients inevitably becomes unstable when a C/I ratio (carrier wave power/ interference wave power) is decreased due to fading with respect to each antenna branch. This is because the tap control is carried out independently with respect to the desired wave and the delayed waves.

In this DS/CDMA receiver, a DS/CDMA signal received through one antenna branch is filtered by a first reception filter 411 (which is referred to as a first receiving unit) at a predetermined frequency band to be produced as a filtered signal which is referred to as a received signal. Thereafter, the filtered signal is orthogonalized by the orthogonalizing filters $413_1$ to $413_n$ controlled by the tap coefficient control circuits $404_1$ to $404_n$ supplied with a plurality of delayed signals $r_{11}$ to $r_{1n}$ obtained by delaying the filtered signal at a plurality of phase synchronizing circuits ($T_1$ to $T_{n-1}$) $412_1$ to $412_n$ with a delay of ($T_i + \ldots + T_{i-1}$) for an (i−1)-th (i=2 to n) delayed wave. The signals $r_{1n}$ and $r_{11}$ are referred to as the primary and the secondary wave components of the received signal, respectively. Orthogonalized filtered signals are transmitted to the differential detection circuits $414_1$ to $414_n$. In the differential detection circuits $414_1$ to $414_n$, phase synchronizing circuits T synchronize phases of the orthogonalized filtered signals to produce synchronized signals $d_{11}$ to $d_{1n}$ which are delivered to the tap coefficient control circuits $404_{11}$ to $404_{1n}$ and multipliers in the differential detection circuits. The multipliers multiply the synchronized signals $d_{11}$ to $d_{1n}$ by predetermined weights to produce weight-multiplied signals which are delivered to a combiner 415. The combiner 415 combines the signals into a combined signal which is delivered to a subtractor 416 and the all output combiner 401.

A DS/CDMA signal received through the other antenna branch is filtered by a second reception filter 421 (which is referred to as a second receiving unit) at a predetermined frequency band to be produced as a filtered signal which is also referred to as a received signal. Thereafter, the filtered signal is orthogonalized by the orthogonalizing filters $423_1$ to $423_n$ controlled by the tap coefficient control circuits $404_1$ to $404_n$ supplied with a plurality of delayed signals $r_{21}$ to $r_{2n}$ obtained by delaying the filtered signal at a plurality of phase synchronizing circuits ($T_1$ to $T_{n-1}$) $422_1$ to $422_n$ with a delay of ($T_i + \ldots + T_{n-1}$) for an (i-1)-th (i=2 to n) delayed wave. The signals $r_{2n}$ and $r_{21}$ are also referred to as the primary and the secondary wave components of the received signal, respectively. Orthogonalized filtered signals are transmitted to the differential detection circuits $424_1$ to $424_n$. In the differential detection circuits $424_1$ to $424_n$, phase synchronizing circuits T synchronize phases of the orthogonalized filtered signals to produce synchronized signals $d_{21}$ to $d_{2n}$ which are delivered to the tap coefficient control circuits $404_1$ to $404_n$ and multipliers in the differential detection circuit. The multipliers multiply the synchronized signals $d_{21}$ to $d_{2n}$ by predetermined weights to produce weight-multiplied signals which are delivered to a combiner 425. The combiner 425 combines the signals into a combined signal which is delivered to a subtractor 426 and the all output combiner 401. Thus, the tap coefficients of the orthogonalizing filters $413_1$ to $413_n$ and the orthogonalizing filters $423_1$ to $423_n$ are calculated by the tap coefficient control circuits $404_1$ to $404_n$.

Supplied from the all output combiner 401 with a synchronized combined signal representative of a total sum of the weight-multiplied synchronized signals, a decision circuit 402 produces a decision signal a representative of a result of decision of whether the synchronized combined signal has a positive sign or a negative sign. Those input and output signals to and from the decision circuit 402 are supplied to a subtractor 403. A subtraction signal b representative of a subtraction result (input-output) is delivered to the tap coefficient control circuits $404_1$ to $404_n$. The decision signal a which is the output signal of the decision circuit 402 is delivered to the subtractors 416 and 426. Supplied with the combined signal from the combiner 415 and with the decision signal a, the subtractor 416 produces a subtraction signal (combined signal-decision signal a) to be delivered to the tap coefficient control circuits $404_1$ to $404_n$. Supplied with the combined signal from the combiner 425 and with the decision 'signal a, the subtractor 426 produces a subtraction signal (combined signal-decision signal a) to be delivered to the tap coefficient control circuits $404_1$ to $404_n$.

In the above-mentioned DS/CDMA receiver, the tap coefficient control circuit $404_i$ (i=1 to n) calculate the tap coefficients used in common to the respective antenna branches by the use of the best quality control information. It is therefore possible to avoid instability in controlling the tap coefficients. Thus, an excellent reception quality can be maintained at a low C/N value, like the foregoing embodiments.

Summarizing, the tap coefficient control circuit $404_n$ serves as a single primary interference canceller control circuit. The single primary interference canceller control circuit controls first and second primary adaptive interference cancellers ($413_n + 414_n$ and $423_n + 424_n$) in common on the basis of primary wave best quality control information relating to one of the primary wave components of the received signals of the first and the second receiving units (411 and 421) that has a best signal quality among the primary wave components of the received signals of the first and the second receiving units.

Likewise, the tap coefficient control circuit $404_1$ serves as a single secondary interference canceller control circuit. The single secondary interference canceller control circuit controls first and second secondary adaptive interference cancellers ($413_1 + 414_1$ and $423_1 + 424_1$) in common on the basis of secondary wave best quality control information relating to one of the secondary wave components of the received signals of the first and the second receiving units (411 and 421) that has a best signal quality among the secondary wave components of the received signals of the first and the second receiving units.

Among the above-mentioned embodiments, the DS/CDMA receivers according to the third and the fourth embodiments of this invention are described as the structures adapted for use in a multiwave environment with a number of delayed waves. In case where the adaptive interference canceller itself has a path diversity effect, the adaptive interference canceller can be implemented, for example, by a single orthogonalizing filter having a tap length over a plurality of symbols. In such an event, the DS/CDMA receivers according to the first and the second embodiments of this invention can be adapted for use in a frequency'selective fading environment with delayed waves. In the foregoing embodiments, each of the adaptive interference cancellers comprises the adaptive filter for producing the tap coefficients orthogonal to the spreading codes of all other stations to remove the interference, and the differential detection circuit for compensating phase fluctuation with reference to the signal from which the interference has been removed with respect to all other stations. However, the differential detection circuit may be replaced by the synchronization detection circuit having an equivalent phase fluctuation compensating function. Although the number m of antenna branches is two in the foregoing embodiments, a similar effect is obtained when the number m of the antenna branches is three or more.

As described, in the DS/CDMA receiver according to this invention, it is possible to maintain a desired reception quality at a low C/N value even if it is used in the narrow-band CDMA system in which the signal power drop resulting from fading is large. In particular, this DS/CDMA receiver is adapted for use in the frequency selective fading environment in which the delayed waves are present in addition to the desired wave, namely, in case where a plurality of the transmission path response components are present in the DS/CDMA signal received through each antenna branch.

What is claimed is:
1. A DS/CDMA receiver comprising:
first through m-th receiving units (111, 121), each of which receives a DS/CDMA signal as a received signal, where m represents a plural number;
first through m-th adaptive interference cancellers (110, 120) connected to said first through said m-th receiving units, respectively, each of said first through said m-th adaptive interference cancellers cancelling an interference on the received signal;

first through m-th interference canceller control means (115, 125) connected to said first through said m-th receiving units, respectively, and connected to said first through said m-th adaptive interference cancellers, respectively, for controlling said first through said m-th adaptive interference cancellers, respectively; and an all output combiner (101) connected to said first through said m-th adaptive interference cancellers for combining all of output signals of said first through said m-th adaptive interference cancellers.

2. A DS/CDMA receiver as claimed in claim 1, wherein each of said first through said m-th adaptive interference cancellers comprises an adaptive filter (112 or 122) for cancelling said interference with respect to all other stations by adaptively making its tap coefficients orthogonal to spreading codes of said all other stations.

3. A DS/CDMA receiver as claimed in claim 1, wherein each of said first through said m-th adaptive interference cancellers comprises:

an adaptive filter (112 or 122) for cancelling said interference with respect to all other stations by adaptively making its tap coefficients orthogonal to spreading codes of said all other stations; and phase synchronizing means (507 or 113 or 123) for compensating for phase fluctuation of an output signal of said adaptive filter.

4. A DS/CDMA receiver comprising:

first through m-th receiving units (211, 221), each of which receives a DS/CDMA signal as a received signal, where m represents a plural number;

first through m-th adaptive interference cancellers (212+213, 222+223) connected to said first through said m-th receiving units, respectively, each of said first through said m-th adaptive interference cancellers cancelling an interference on the received signal;

single interference canceller control means (204) connected to said first through said m-th receiving units and connected to said first through said m-th adaptive interference cancellers for controlling said first through said m-th adaptive interference cancellers in common; and an all output combiner (201) connected to said first through said m-th adaptive interference cancellers for combining all of output signals of said first through said m-th adaptive interference cancellers.

5. A DS/CDMA receiver as claimed in claim 4, wherein each of said first through said m-th adaptive interference cancellers comprises an adaptive filter (212 or 222) for cancelling said interference with respect to all other stations by adaptively making its tap coefficients orthogonal to spreading codes of said all other stations.

6. A DS/CDMA receiver as claimed in claim 4, wherein each of said first through said m-th adaptive interference cancellers comprises:

an adaptive filter (212 or 222) for cancelling said interference with respect to all other stations by adaptively making its tap coefficients orthogonal to spreading codes of said all other stations; and phase synchronizing means (507 or 213 or 223) for compensating for phase fluctuation of an output signal of said adaptive filter.

7. A DS/CDMA receiver as claimed in claim 4, wherein said single interference canceller control means controls said first through said m-th adaptive interference cancellers in common on the basis of best quality control information relating to one of the received signals of said first through said m-th receiving units that has a best signal quality among the received signals of said first through said m-th receiving units.

8. A DS/CDMA receiver comprising:

first through m-th receiving units (311, 321), each of which receives a DS/CDMA signal as a received signal having a primary wave component and a secondary wave component following said primary wave component, where m represents a first plural number;

first through m-th primary adaptive interference cancellers ($313_n+314_n$, $323_n+324_n$) connected to said first through said m-th receiving units, respectively, each of said first through said m-th primary adaptive interference cancellers cancelling an interference for the primary wave component of said received signal;

first through m-th secondary adaptive interference cancellers ($313_1+314_1$, $323_1+324_1$) connected to said first through said m-th receiving units, respectively, each of said first through said m-th secondary adaptive interference cancellers cancelling an interference for the secondary wave component of said received signal;

first through m-th primary interference canceller control means ($304_{1n}$, $304_{2n}$) connected to said first through said m-th receiving units, respectively, and connected to said first through said m-th primary adaptive interference cancellers, respectively, for controlling said first through said m-th primary adaptive interference cancellers, respectively;

first through m-th secondary interference canceller control means ($304_{11}$, $304_{21}$) connected to said first through said m-th receiving units, respectively, and connected to said first through said m-th secondary adaptive interference cancellers, respectively, for controlling said first through said m-th secondary adaptive interference cancellers, respectively; and an all output combiner (301, 315, 325) connected to said first through said m-th primary adaptive interference cancellers and connected to said first through said m-th secondary adaptive interference cancellers for combining all of output signals of said first through said m-th primary adaptive interference cancellers and of said first through said m-th secondary adaptive interference cancellers.

9. A DS/CDMA receiver as claimed in claim 8, wherein each of said first through said m-th primary adaptive interference cancellers and said first through said m-th secondary adaptive interference cancellers comprises an adaptive filter ($313_n$ or $323_n$ or $313_1$ or $323_1$) for cancelling said interference with respect to all other stations by adaptively making its tap coefficients orthogonal to spreading codes of said all other stations.

10. A DS/CDMA receiver as claimed in claim 8, wherein each of said first through said m-th primary adaptive interference cancellers and said first through said m-th secondary adaptive interference cancellers comprises:

an adaptive filter ($313_n$ or $323_n$ or $313_1$ or $323_1$) for cancelling said interference with respect to all other stations by adaptively making its tap coefficients orthogonal to spreading codes of said all other stations; and phase synchronizing means (507 or $314_n$ or $324_n$ or $314_1$ or $324_1$) for compensating for phase fluctuation of an output signal of said adaptive filter.

11. A DS/CDMA receiver comprising:

first through m-th receiving units (411, 421), each of which receives a DS/CDMA signal as a received signal having a primary wave component and a secondary wave component following said primary wave component, where m represents a first plural number;

first through m-th primary adaptive interference cancellers ($413_n+414_n$, $423_n+424_n$) connected to said first through said m-th receiving units, respectively, each of said first through said m-th primary adaptive interference cancellers cancelling an interference for the primary wave component of said received signal;

first through m-th secondary adaptive interference cancellers ($413_1+414_1$, $423_1+424_1$) connected to said first through said m-th receiving units, respectively, each of said first through said m-th secondary adaptive interference cancellers cancelling an interference for the secondary wave component of said received signal;

single primary interference canceller control means ($404_n$) connected to said first through said m-th receiving units and connected to said first through said m-th primary adaptive interference cancellers for controlling said first through said m-th primary adaptive interference cancellers in common;

single secondary interference canceller control means ($404_1$) connected to said first through said m-th receiving units and connected to said first through said m-th secondary adaptive interference cancellers for controlling said first through said m-th secondary adaptive interference cancellers in common; and an all output combiner (401, 415, 425) connected to said first through said m-th primary adaptive interference cancellers and connected to said first through said m-th secondary adaptive interference cancellers for combining all of output signals of said first through said m-th primary adaptive interference cancellers and of said first through said m-th secondary adaptive interference cancellers.

12. A DS/CDMA receiver as claimed in claim 11, wherein each of said first through said m-th primary adaptive interference cancellers and said first through said m-th secondary adaptive interference cancellers comprises an adaptive filter ($413_n$ or $423_n$ or $413_1$ or $423_1$) for cancelling said interference with respect to all other stations by adaptively making its tap coefficients orthogonal to spreading codes of said all other stations.

13. A DS/CDMA receiver as claimed in claim 11, wherein each of said first through said m-th primary adaptive interference cancellers and said first through said m-th secondary adaptive interference cancellers comprises:

an adaptive filter ($413_n$ or $423_n$ or $413_1$ or $423_1$) for cancelling said interference with respect to all other stations by adaptively making its tap coefficients orthogonal to spreading codes of said all other stations; and phase synchronizing means (507 or $414_n$ or $424_n$ or $414_1$ or $424_1$) for compensating for phase fluctuation of an output signal of said adaptive filter.

14. A DS/CDMA receiver as claimed in claim 11, wherein:

said single primary interference canceller control means controls said first through said m-th primary adaptive interference cancellers in common on the basis of primary wave best quality control information relating to one of the primary wave components of the received signals of said first through said m-th receiving units that has a best signal quality among the primary wave components of the received signals of said first through said m-th receiving units;

said single secondary interference canceller control means controlling said first through said m-th secondary adaptive interference cancellers in common on the basis of secondary wave best quality control information relating to one of the secondary wave components of the received signals of said first through said m-th receiving units that has a best signal quality among the secondary wave components of the received signals of said first through said m-th receiving units.

* * * * *